UNITED STATES PATENT OFFICE.

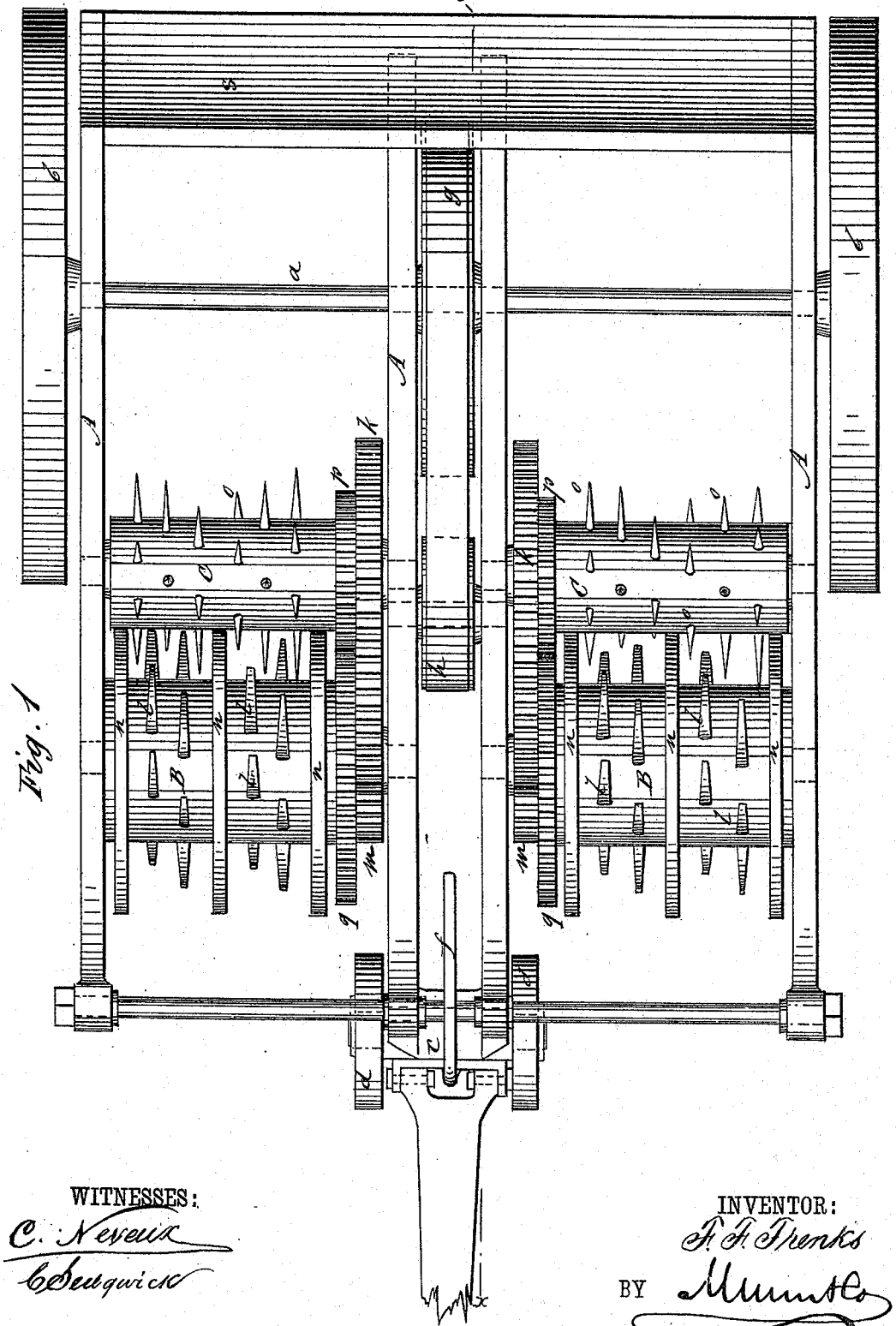

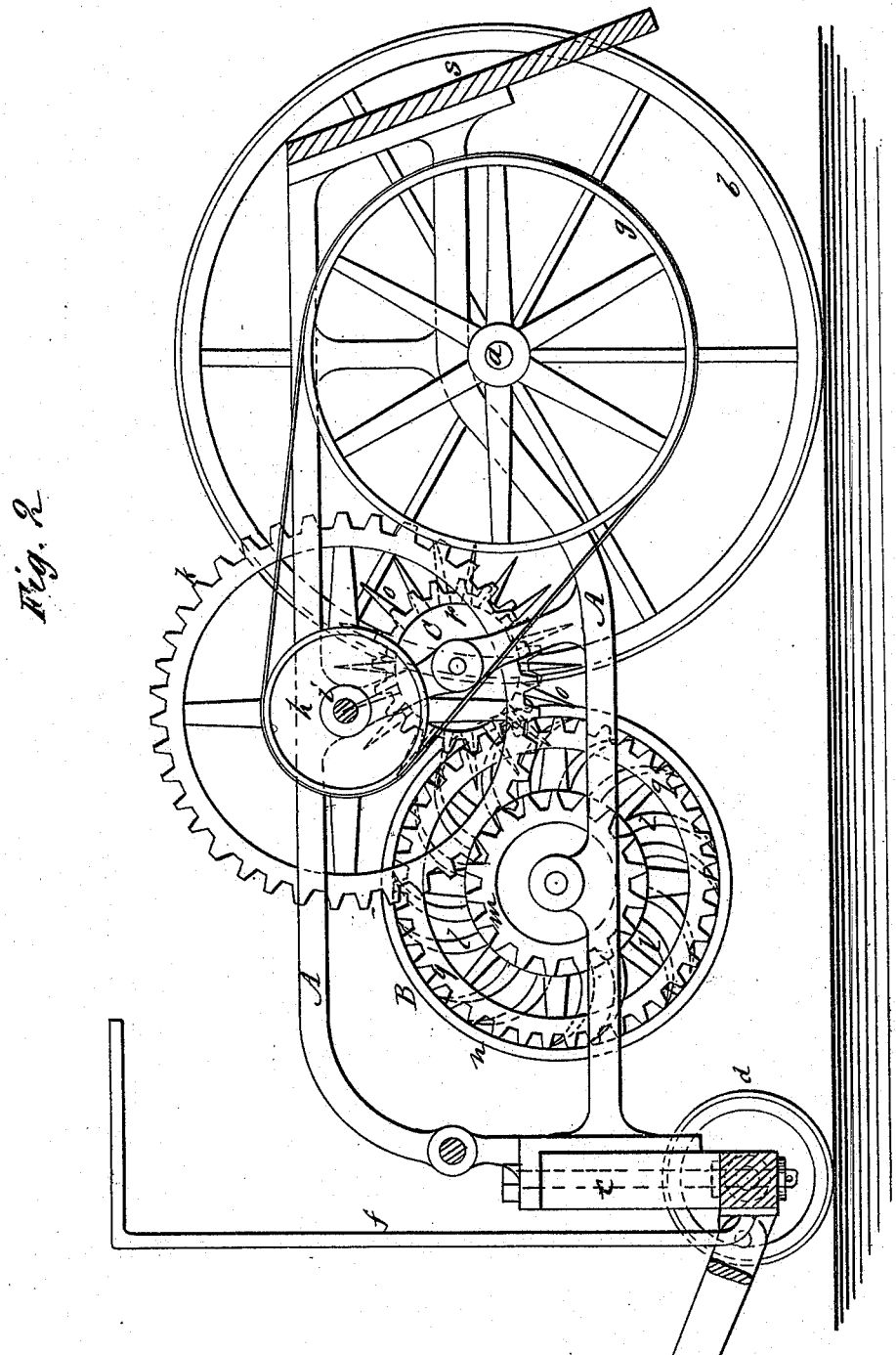

FREDERICK F. TRENKS, OF ROUND TOP, TEXAS.

IMPROVEMENT IN COTTON-PICKING MACHINES.

Specification forming part of Letters Patent No. 221,755, dated November 18, 1879; application filed March 14, 1879.

*To all whom it may concern:*

Be it known that I, FREDERICK F. TRENKS, of Round Top, in the county of Fayette and State of Texas, have invented a new and useful Improvement in Cotton-Picking Machines, of which the following is a specification.

My improvements relate to machines for picking cotton from the plants, and will be described in connection with the drawings, wherein—

Figure 1 is a plan view of the machine. Fig. 2 is a sectional side elevation on line $x$ $x$ of Fig. 1.

Similar letters of reference indicate corresponding parts.

The operative parts of the machine are carried upon a wood or iron frame or truck, A, which frame is mounted at the rear upon an axle, $a$, and wheels $b$ $b$, and at the front is supported by a swivel-truck, $c$, and wheels $d$ $d$. The truck $c$ is furnished with a handle, $f$, by which it is turned to guide the machine.

Upon the axle $a$ is a pulley, $g$, that is belted to a pulley, $h$, which is on a counter-shaft, $i$, fitted in bearings at the center of the machine on the frame.

Upon shaft $i$ are cog-wheels $k$, that drive the picking-cylinders B, which are mounted one at each side of the machine and at the forward part.

The picking-cylinders B are similar in character. Upon the surface of each are sharp-pointed and curved fingers $l$, sufficiently numerous to remove all the cotton from the stalks and retain it upon the cylinder.

Each cylinder B has three radial flanges, $n$, one at each end and in the center, the edges of which flanges are about on line with the points of fingers $l$.

The cylinders B are fitted in bearings in frame A, and their lower side should come on a line with the tops of the plants. Upon their axis are gear-wheels $m$, which mesh with wheels $k$ on shaft $i$.

At the rear of each cylinder B, and above their axis, are mounted strippers C, which consist of small cylinders having numerous sharp-pointed teeth $o$ projecting radially, which teeth $o$ pass between the fingers $l$ of the picking-cylinders.

Gear-wheels $p$ on the axis of strippers C mesh with the gears $q$ on the axis of B, so that the power to drive the strippers and pickers is obtained from the main axle $a$ of the machine.

The machine operates as next described. It will be drawn over the ground by horse-power, the wheels $b$ running between the rows of plants, and two or more rows being acted upon by each picking-cylinder.

The cylinders B are caused to revolve by the forward movement of the machine, and the teeth $l$ pick or strip the cotton from the plants. The curved shape of fingers $l$ causes them to retain the cotton, which is carried upward until it is stripped from the fingers $l$ by the teeth $o$ of strippers C.

The strippers C revolve with considerable rapidity, and throw the cotton to the rear behind the rear board, $s$, into a suitable receptacle. The flanges $n$ act to bend down the plants, so that the fingers $o$ may act more efficiently in removing the cotton.

I am aware that it is not new to pick by means of a brush or saw; but

What I claim is—

In a cotton-picking machine, the picking-cylinder B, provided with curved fingers $l$ and flanges $n$, extending beyond the picker-fingers, as and for the purposes set forth.

F. F. TRENKS.

Witnesses:
WM. DORNWELL,
ALEX. FROSCH.